(12) United States Patent
Maeda et al.

(10) Patent No.: US 9,762,671 B2
(45) Date of Patent: Sep. 12, 2017

(54) WIRELESS ACCESS DEVICE AND WIRELESS ACCESS SYSTEM

(71) Applicant: Panasonic Intellectual Property Management Co., Ltd., Osaka (JP)

(72) Inventors: Takuji Maeda, Osaka (JP); Masayuki Toyama, Osaka (JP)

(73) Assignee: PANASONIC INTELLECTUAL PROPERTY MANAGEMENT CO., LTD., Osaka (JP)

(*) Notice: Subject to any disclaimer, the term of this patent is extended or adjusted under 35 U.S.C. 154(b) by 163 days.

(21) Appl. No.: 14/739,029

(22) Filed: Jun. 15, 2015

(65) Prior Publication Data

US 2015/0281361 A1   Oct. 1, 2015

Related U.S. Application Data

(63) Continuation of application No. PCT/JP2014/000781, filed on Feb. 17, 2014.

(30) Foreign Application Priority Data

Feb. 20, 2013   (JP) .................. 2013-030712

(51) Int. Cl.
*G06F 15/16* (2006.01)
*H04L 29/08* (2006.01)
(Continued)

(52) U.S. Cl.
CPC .... *H04L 67/1097* (2013.01); *G06F 17/30067* (2013.01); *H04B 7/24* (2013.01); *H04L 67/12* (2013.01); *H04L 67/06* (2013.01)

(58) Field of Classification Search
None
See application file for complete search history.

(56) References Cited

U.S. PATENT DOCUMENTS 5,293,606 A   3/1994 Sassenrath
6,701,455 B1  3/2004 Yamamoto et al.
(Continued)

FOREIGN PATENT DOCUMENTS

EP   2 120 165   11/2009
JP   2003-6137   1/2003
(Continued)

OTHER PUBLICATIONS

International Search Report issued Apr. 22, 2014 in International (PCT) Application No. PCT/JP2014/000781.
(Continued)

*Primary Examiner* — Mohamed Ibrahim
(74) *Attorney, Agent, or Firm* — Wenderoth, Lind & Ponack, L.L.P.

(57) ABSTRACT

A file copy controller in a wireless access device reads file system management information of both of a local memory and a remote memory, generates a FS transfer list in which logical address positions of copy sources and logical address positions of copy destinations are stored, and inputs the FS transfer list to a non-volatile memory controller connected to the local memory. The non-volatile memory controller performs copy operation between the local memory and the remote memory based on the information stored in the FS transfer list without using a CPU in an access device or an internal bus connected to the CPU.

10 Claims, 20 Drawing Sheets

(51) Int. Cl.
*G06F 17/30* (2006.01)
*H04B 7/24* (2006.01)

(56) References Cited

U.S. PATENT DOCUMENTS

| | | |
|---|---|---|
| 2003/0018852 A1 | 1/2003 | McLinn |
| 2005/0108472 A1 | 5/2005 | Kanai et al. |
| 2005/0257022 A1 | 11/2005 | Hughes |
| 2006/0031650 A1 | 2/2006 | Kanai et al. |
| 2007/0130108 A1* | 6/2007 | Simpson, Jr. ...... G06F 17/30489 |
| 2007/0198798 A1 | 8/2007 | Kanai et al. |
| 2010/0122051 A1 | 5/2010 | Maki et al. |
| 2011/0022645 A1 | 1/2011 | Maeda et al. |
| 2011/0302225 A1 | 12/2011 | Maeda et al. |
| 2012/0198271 A1 | 8/2012 | Maki et al. |
| 2012/0290942 A1 | 11/2012 | Lim |
| 2013/0166670 A1* | 6/2013 | Wayda ................ H04L 67/1095 709/213 |
| 2013/0198434 A1* | 8/2013 | Mylly ................. G06F 12/0246 711/103 |

FOREIGN PATENT DOCUMENTS

| | | |
|---|---|---|
| JP | 2005-149082 | 6/2005 |
| JP | 4074072 | 4/2008 |
| JP | 2008-258755 | 10/2008 |
| JP | 2009-217707 | 9/2009 |
| JP | 2010-113559 | 5/2010 |
| JP | 2011-138534 | 7/2011 |
| WO | 00/63801 | 10/2000 |

OTHER PUBLICATIONS

Extended European Search Report issued Feb. 17, 2016 in corresponding European Application No. 14754568.5.

* cited by examiner

FIG. 11

| Logical cluster number | First FAT 305, second FAT 306 |
|---|---|
| 0x0002 | 0x0003 |
| 0x0003 | 0x0004 |
| 0x0004 | 0x0006 |
| 0x0005 | 0x0000 |
| 0x0006 | 0x0009 |
| 0x0007 | 0x0000 |
| 0x0008 | 0x0000 |
| 0x0009 | 0x000A |
| 0x000A | 0x000B |
| 0x000B | 0x000C |
| 0x000C | 0x000D |
| 0x000D | 0x0010 |
| 0x000E | 0x0000 |
| 0x000F | 0x0000 |
| 0x0010 | 0xFFFF |
| 0x0011 | 0x0000 |
| 0x0012 | 0x0000 |
| 0x0013 | 0x0000 |
| 0x0014 | 0x0000 |
| 0x0015 | 0x0000 |
| 0x0016 | 0x0000 |
| 0x0017 | 0x0000 |
| : | : |

FIG. 12

| Logical cluster number | First FAT 305, second FAT 306 |
|---|---|
| 0x0002 | 0xXXXX |
| 0x0003 | 0x0000 |
| 0x0004 | 0x0000 |
| 0x0005 | 0xXXXX |
| 0x0006 | 0xXXXX |
| 0x0007 | 0xXXXX |
| 0x0008 | 0x0000 |
| 0x0009 | 0xXXXX |
| 0x000A | 0x0000 |
| 0x000B | 0xXXXX |
| 0x000C | 0xXXXX |
| 0x000D | 0xXXXX |
| 0x000E | 0xXXXX |
| 0x000F | 0x0000 |
| 0x0010 | 0x0000 |
| 0x0011 | 0x0000 |
| 0x0012 | 0x0000 |
| 0x0013 | 0xXXXX |
| 0x0014 | 0xXXXX |
| 0x0015 | 0x0000 |
| 0x0016 | 0x0000 |
| 0x0017 | 0x0000 |
| : | : |

FIG. 13

FS transfer list 121

| List number | Transfer direction | Transfer source logical address | Transfer destination logical address | The number of transfer clusters |
|---|---|---|---|---|
| 1 | L to R | 0x0002 | 0x0003 | 2 |
| 2 | L to R | 0x0004 | 0x0008 | 1 |
| 3 | L to R | 0x0006 | 0x000A | 1 |
| 4 | L to R | 0x0009 | 0x000F | 4 |
| 5 | L to R | 0x000D | 0x0015 | 1 |
| 6 | L to R | 0x0010 | 0x0016 | 1 |

FIG. 17

FS transfer list 122

| List number | Transfer direction | Transfer source logical address | Transfer destination logical address 1 | The number of transfer clusters 1 | Transfer destination logical address 2 | The number of transfer clusters 2 |
|---|---|---|---|---|---|---|
| 1 | L to R | 0x0002 | 0x0003 | 2 | 0x0008 | 1 |
| 2 | L to R | 0x0006 | 0x000A | 1 | 0xFFFF | 0 |
| 3 | L to R | 0x0009 | 0x000F | 4 | 0x0015 | 1 |
| 4 | L to R | 0x0010 | 0x0016 | 1 | 0xFFFF | 0 |

FIG. 18

FS transfer list 123

| List number | Transfer direction | Transfer source logical address 1 | The number of transfer clusters 1 | Transfer source logical address 2 | The number of transfer clusters 2 | Transfer destination logical address |
|---|---|---|---|---|---|---|
| 1 | L to R | 0x0002 | 2 | 0xFFFF | 0 | 0x0003 |
| 2 | L to R | 0x0004 | 1 | 0xFFFF | 0 | 0x0008 |
| 3 | L to R | 0x0006 | 1 | 0xFFFF | 0 | 0x000A |
| 4 | L to R | 0x0009 | 4 | 0xFFFF | 0 | 0x000F |
| 5 | L to R | 0x000D | 1 | 0x0010 | 1 | 0x0015 |

FIG. 19

FS transfer list 124

| List number | Transfer direction | Transfer source logical address 1 | The number of transfer clusters 1 | Transfer source logical address 2 | The number of transfer clusters 2 | Transfer destination logical address 1 | The number of transfer clusters 1 | Transfer destination logical address 2 | The number of transfer clusters 2 |
|---|---|---|---|---|---|---|---|---|---|
| 1 | L to R | 0x0002 | 3 | 0xFFFF | 0 | 0x0003 | 2 | 0x0008 | 1 |
| 2 | L to R | 0x0006 | 1 | 0xFFFF | 0 | 0x000A | 1 | 0xFFFF | 0 |
| 3 | L to R | 0x0009 | 5 | 0x0010 | 1 | 0x000F | 6 | 0xFFFF | 0 |

FIG. 20

| Logical cluster number | First FAT 305, second FAT 306 |
|---|---|
| 0x0002 | 0xXXXX |
| 0x0003 | 0x0000 |
| 0x0004 | 0x0000 |
| 0x0005 | 0xXXXX |
| 0x0006 | 0xXXXX |
| 0x0007 | 0xXXXX |
| 0x0008 | 0x0000 |
| 0x0009 | 0xXXXX |
| 0x000A | 0x0000 |
| 0x000B | 0xXXXX |
| 0x000C | 0xXXXX |
| 0x000D | 0xXXXX |
| 0x000E | 0xXXXX |
| 0x000F | 0x0000 |
| 0x0010 | 0x0000 |
| 0x0011 | 0x0000 |
| 0x0012 | 0x0000 |
| 0x0013 | 0x0000 |
| 0x0014 | 0x0000 |
| 0x0015 | 0x0000 |
| 0x0016 | 0x0000 |
| 0x0017 | 0x0000 |
| : | : |

WIRELESS ACCESS DEVICE AND WIRELESS ACCESS SYSTEM

BACKGROUND OF THE INVENTION

1. Field of the Invention

The present disclosure relates to a wireless access device which accesses a non-volatile memory wirelessly connected to the wireless access device, and a wireless access system which has a function of accessing the non-volatile memory wirelessly.

2. Description of the Related Art

There are various types of recording media such as magnetic disks, optical disks, USB memories and flash card memories and these recording media record various types of items of digital data such as text documents, presentation data, music contents, and video data. Conventionally, these recording media are mainly used as local storages physically connected directly to host devices such as a PC (Personal Computer), a DSC (Digital Still Camera) or a smartphone which manage data.

However, with development of a cloud computing due to the widespread use of a high-speed wired/wireless network infrastructure, a mode of access to remote storage on a network is being used in various life scenes.

Conventionally, as an example of this mode, a method of mounting a wireless function on a memory card, accessing a large-volume storage such as an external hard disk by wireless communication and reading and writing data has been proposed (e.g. PTL 1).

By using this technique, it is possible to manage a memory (remote memory) of an external device which is a destination on a wireless network as a memory (local memory) directly connected to a wireless access device, and provide advantages of easily adding a capacity to the wireless access device, allowing the remote memory to be used between a plurality of host devices at the same time and the like.

CITATION LIST

Patent Literature

PTL 1: U.S. Patent Publication No. 2003/0018852

SUMMARY OF THE INVENTION

A wireless access device according to the present disclosure and a wireless access system according to the present disclosure are a wireless access device and a wireless access system which copies data between a file in a file system constructed on a first non-volatile memory and a file in a file system constructed on a second non-volatile memory in another wireless access device wirelessly connected to the wireless access devise. The wireless access device include a file copy controller which identifies a logical address of a transfer source and a logical address of a transfer destination based on first file system management information read from the file system constructed on the first non-volatile memory and second file system management information read from the file system constructed on the second non-volatile memory, and generates a FS (File System) transfer list which lists the logical addresses together with a transfer data size, and a non-volatile memory controller which controls the first non-volatile memory. The file copy controller inputs the FS transfer list to the first non-volatile memory controller, and the non-volatile memory controller copies data between the first non-volatile memory and the second non-volatile memory based on the FS transfer list.

Consequently, according to the present disclosure, it is possible to copy files at a high speed without depending on performances of a CPU (Central Processing Unit) in a wireless access device and a bus bandwidth when the files are copied between the first non-volatile memory and the second non-volatile memory.

That is, it is possible to copy files at a high speed without depending on performance of the CPU in the wireless access device and a bandwidth of the bus when accesses to both of a local memory connected to the wireless access device and a remote memory connected via a wireless network.

BRIEF DESCRIPTION OF DRAWINGS

FIG. 11 is an explanatory view illustrating an example of a FAT table according to the first exemplary embodiment.

FIG. 12 is an explanatory view illustrating another example of the FAT table according to the first exemplary embodiment.

FIG. 13 is an explanatory view illustrating an example of a FS transfer list according to the first exemplary embodiment.

FIG. 17 is an explanatory view illustrating an example of a FS transfer list corresponding to 1-to-n transfer (n is an integer equal to or more than 2) according to the first exemplary embodiment.

FIG. 18 is an explanatory view illustrating an example of the FS transfer list corresponding to n-to-1 transfer (n is an integer equal to or more than 2) according to the first exemplary embodiment.

FIG. 19 is an explanatory view illustrating an example of the FS transfer list corresponding to n-to-1 transfer and 1-to-n transfer (n is an integer equal to or more than 2) according to the first exemplary embodiment.

FIG. 20 is an explanatory view illustrating another example of the FAT table according to the first exemplary embodiment.

DETAILED DESCRIPTION OF THE PREFERRED EMBODIMENT

An exemplary embodiment will be described in detail below optionally with reference to the drawings. However, the exemplary embodiment will not be described in detail more than necessary in some cases. For example, in some cases, matters which have already been well known will not be described in detail, and substantially the same components will not be described again.

This is to prevent the following description from being redundant more than necessary, and help those skilled in the art understand the following description.

In addition, the accompanying drawings and the following description are provided to make it easy for those skilled in the art to sufficiently understand the present disclosure, and do not intend to limit the subject matters recited in the claims.

A wireless access device, an access device, a wireless information recording device and a wireless access system according to the present disclosure will be described below with reference to the drawings.

First Exemplary Embodiment

According to a conventional technique, when a remote memory connected via a network is managed and is accessed similar to a local memory directly connected to a wireless access device, the access to the remote memory can be made only by changing a device driver portion which directly accesses the local memory. It is assumed that copying a file between the local memory and the remote memory. Copying file is performed by a control program of a file system running on a CPU of a host device.

For example, the control program of the file system refers to file system management information of both of the local memory and the remote memory, identifies a logical address in which data of a copy source file is stored and identifies a logical address in which data of a copy destination file is stored. Subsequently, the control program of the file system reads data of the copy source file to a RAM (Random Access Memory) in the host device, and writes the read data in a data storage position of the copy destination file. That is, copying files between the local memory and the remote memory is performed in operation of the CPU in the host device through the RAM in the host device. Hence, operation speed of copying files depends on operation performance of the CPU in the host device, a bandwidth of a bus connected to the RAM in the host device or the like. When these performances are low, copying files cannot be performed at a high speed.

In view of the above problem, an object of the present disclosure is to provide a wireless access device, an access device, a wireless information recording device and a wireless access system which, when accesses to both of a local memory connected to a wireless access device and a remote memory connected via a wireless network copying files is performed at a high speed without depending on performance of a CPU in the access device and without depending on a bandwidth of a bus.

Figure 1:
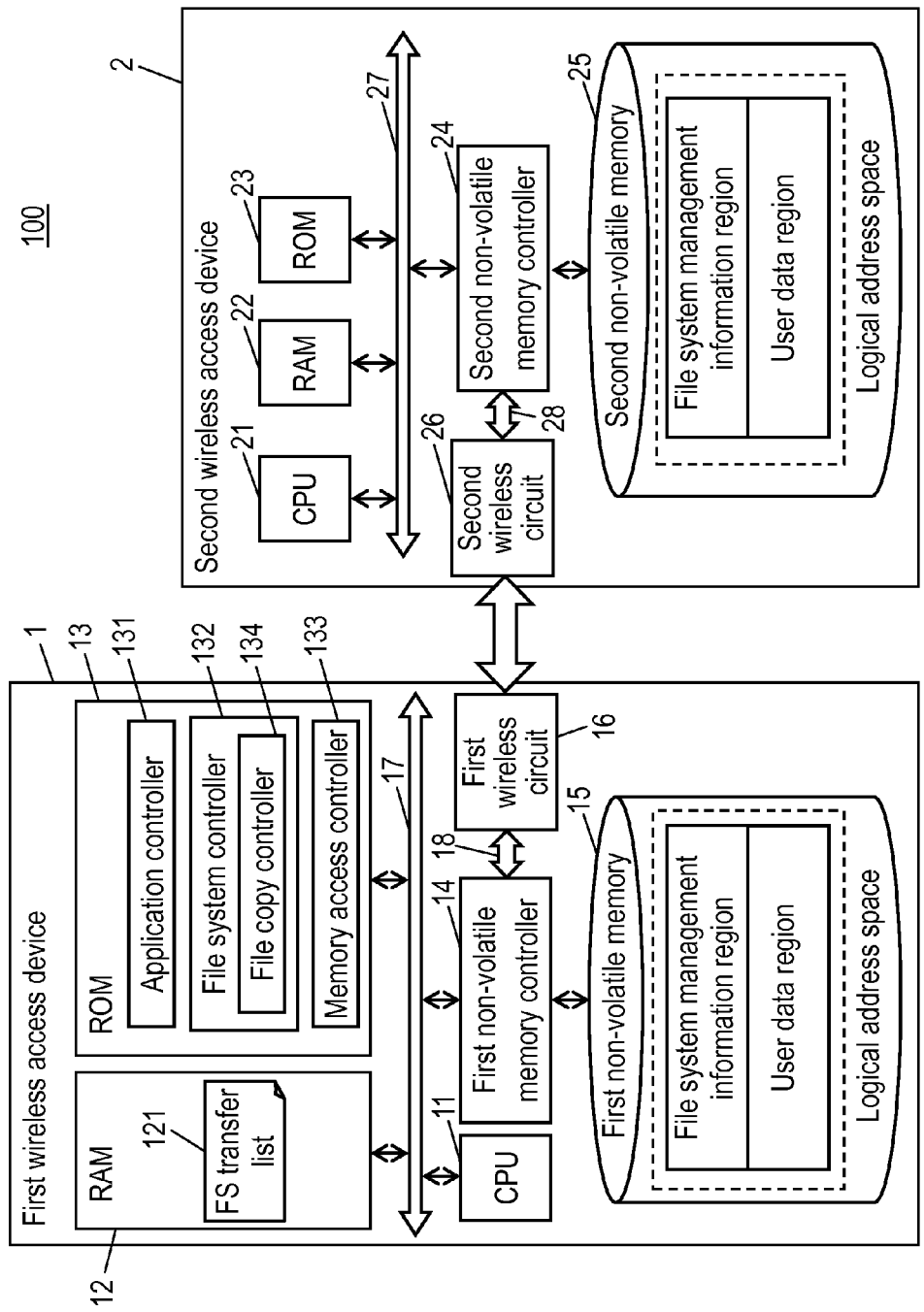
FIG. 1 is a configuration diagram of a wireless access device and a wireless access system according to a first exemplary embodiment.

FIG. 1 is a view illustrating a configuration of a wireless access device and a configuration of a wireless access system according to the present exemplary embodiment. In FIG. 1, wireless access system 100 includes first wireless access device 1 and second wireless access device 2. In wireless access system 100, assume that first wireless access device 1 manages first non-volatile memory 15 included in first wireless access device 1 as a local memory and manages second non-volatile memory 25 included in second wireless access device 2 as a remote memory, and accesses first non-volatile memory 15 and second non-volatile memory 25. First wireless access device 1 includes CPU 11, RAM 12, ROM (Read Only Memory) 13 and first non-volatile memory controller 14, which are connected with each other through first internal bus 17. First wireless access device 1 further includes first non-volatile memory 15 connected to first non-volatile memory controller 14, and first wireless circuit 16 connected through second internal bus 18. Programs which control the first wireless access device 1 are stored in ROM 13, and these programs use RAM 12 as a temporary memory region and operate on CPU 11.

First non-volatile memory controller 14 actually issues a Read command, a Write command and other control commands to first non-volatile memory 15, and controls reading and writing of first non-volatile memory 15.

Further, first wireless circuit 16 is a control circuit which wirelessly communicates with second wireless access device 2, and is, for example, a control circuit which supports wireless LAN (Local Area Network) standards of 802.11a/b/g/n, control circuits which support wireless LAN standards of 802.11ac and 802.11ad which are expected to be spread in future, and other control circuits for wireless communication such as Bluetooth (registered trademark) of near field wireless communication standards and Transfer Jet (registered trademark) of a near field wireless transfer technique. The present disclosure is not limited to a particular wireless communication method, so that it is possible to use a control circuit of arbitrary wireless communication as first wireless circuit 16.

ROM 13 further includes application controller 131, file system controller 132 and memory access controller 133. Application controller 131 generates data and controls a power source, that is, controls entire first wireless access device 1. File system controller 132 performs control of managing data as a file using a file system such as a FAT file system. Memory access controller 133 receives an access size and an access destination logical address together with data from file system controller 132, and records data of a specified size in a specified logical address in first non-volatile memory 15 which is the local memory or second non-volatile memory 25 which is the remote memory, that is, controls transmission and reception of commands and data to the local memory and the remote memory. File system controller 132 further includes file copy controller 134. File copy controller 134 is a controller which performs file copy operation between the local memory and the remote memory which is a feature of the present disclosure, and is not included in a conventional wireless access device.

Further, first non-volatile memory controller 14 also has a function of controlling FS transfer list 121 which is a file system transfer list described below, and is not included in the conventional access device.

Meanwhile, in FIG. 1, second wireless access device 2 includes CPU 21, RAM 22, ROM 23 and second non-volatile memory controller 24 which are connected with each other through first internal bus 27. Second wireless access device 2 further includes second non-volatile memory 25 connected to second non-volatile memory controller 24, and second wireless circuit 26 connected through second internal bus 28. Programs which control second wireless access device 2 are stored in ROM 23 and these programs use RAM 22 as a temporary memory region and operate on CPU 21. Second non-volatile memory controller 24 actually issues a Read command, a Write command and other control commands to second non-volatile memory 25, and controls reading and writing of second non-volatile memory 25. Further, second wireless circuit 26 is a control circuit which wirelessly communicates with first wireless access device 1, and can perform arbitrary wireless communication with first wireless circuit 16. An internal configuration of second wireless access device 2 is the same as an internal configuration of first wireless access device 1.

Second wireless access device 2, according to the present exemplary embodiment, operates as a device that second non-volatile memory 25 in second wireless access device 2 is a remote memory which first wireless access device 1 can access. Second non-volatile memory controller 24 controls access to second non-volatile memory 25 from first wireless access device 1, and CPU 21 in second wireless access device 2 does not control the access. Hence, details of various programs stored in ROM 23 in second wireless access device 2 will not be described in the present exemplary embodiment.

Figure 2:
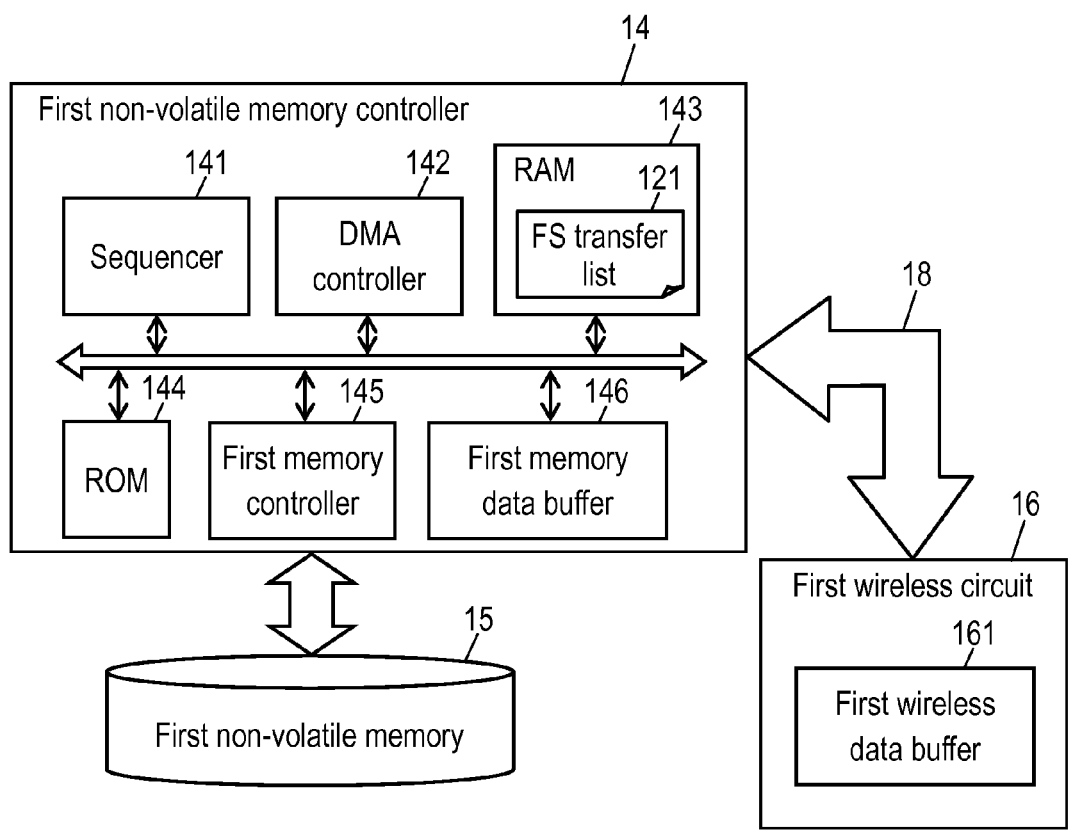
FIG. 2 is a configuration diagram of a first non-volatile memory controller according to the first exemplary embodiment.

Subsequently, configurations of first non-volatile memory controller 14 and second non-volatile memory controller 24, according to the present exemplary embodiment, will be described with reference to FIGS. 2 and 3. In FIG. 2, first non-volatile memory controller 14 includes sequencer 141, DMA (Direct Memory Access) controller 142, RAM 143, ROM 144, first memory controller 145 and first memory data buffer 146. Sequencer 141 is a controller which controls first non-volatile memory controller 14, and performs various types of operation with microcodes stored in ROM 144.

Sequencer 141 performs only limited operation in first non-volatile memory controller 14, and therefore may be realized using another control circuit such as a small microcomputer.

DMA controller 142 is a controller which controls DMA (Direct Memory Access) transfer of various items of data between each component in first non-volatile memory controller 14 and first wireless data buffer 161 in first wireless circuit 16.

First memory controller 145 is a controller which actually issues a Read command, a Write command and other control commands to first non-volatile memory 15, and accesses to first non-volatile memory 15.

First memory data buffer 146 is a buffer which stores various items of data generated during the access to first non-volatile memory 15. First non-volatile memory controller 14, according to the present exemplary embodiment, receives an input of FS transfer list 121 from CPU 11, and sequencer 141 interprets FS transfer list 121 and accesses first non-volatile memory 15 which is the local memory and second non-volatile memory 25 which is the remote memory.

Figure 3:
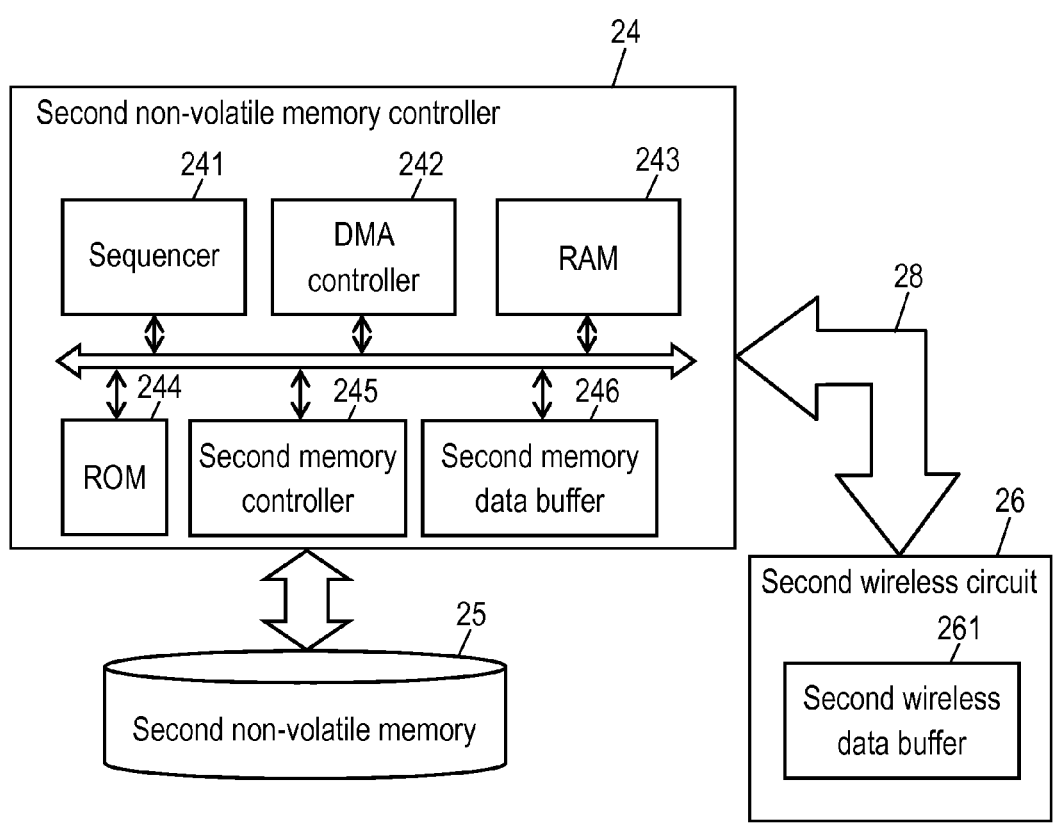
FIG. 3 is a configuration diagram of a second non-volatile memory controller according to the first exemplary embodiment.

In FIG. 3, second non-volatile memory controller 24 includes sequencer 241, DMA controller 242, RAM 243, ROM 244, second memory controller 245 and second memory data buffer 246. Sequencer 241 is a controller which controls second non-volatile memory controller 24, and performs various types of operation with microcodes stored in ROM 244.

Sequencer 241 performs only limited operation in second non-volatile memory controller 24, and therefore may be realized using another control circuit such as a small microcomputer.

DMA controller 242 is a controller which controls DMA (Direct Memory Access) transfer of various data between each component in second non-volatile memory controller 24 and second wireless data buffer 261 in second wireless circuit 26.

Second memory controller 245 is a controller which actually issues a Read command, a Write command and other control commands to second non-volatile memory 25, and accesses to second non-volatile memory 25. Second non-volatile memory controller 24 is basically the same as the configuration of first non-volatile memory controller 14.

With this configuration, in the present exemplary embodiment, file system controller 132 in first wireless access device 1 manages first non-volatile memory 15 in first wireless access device 1 as the local memory and second non-volatile memory 25 in second wireless access device 2 as the remote memory, and file copy controller 134 and first non-volatile memory controller 14 operate in collaboration to copy files at a high speed. The high speed copy according to the present exemplary embodiment will be described in detail below.

Upon high speed file copy operation according to the present exemplary embodiment, first non-volatile memory controller 14 actually performs data copy operation based on FS transfer list 121 generated by file copy controller 134. FS transfer list 121 will be described later in detail. This FS transfer list 121 is generated based on region management information included in file system management information, and therefore is associated with file system management information. Hence, a FAT (File Allocation Table) file system will be described as an example of a file system. The FAT file system will be described as an example, in the present exemplary embodiment, however, the present disclosure is not limited to a type of a file system, and is applicable to other file systems such as a UDF (Universal Disc Format) and a NTFS (NT File System).

Figure 4:
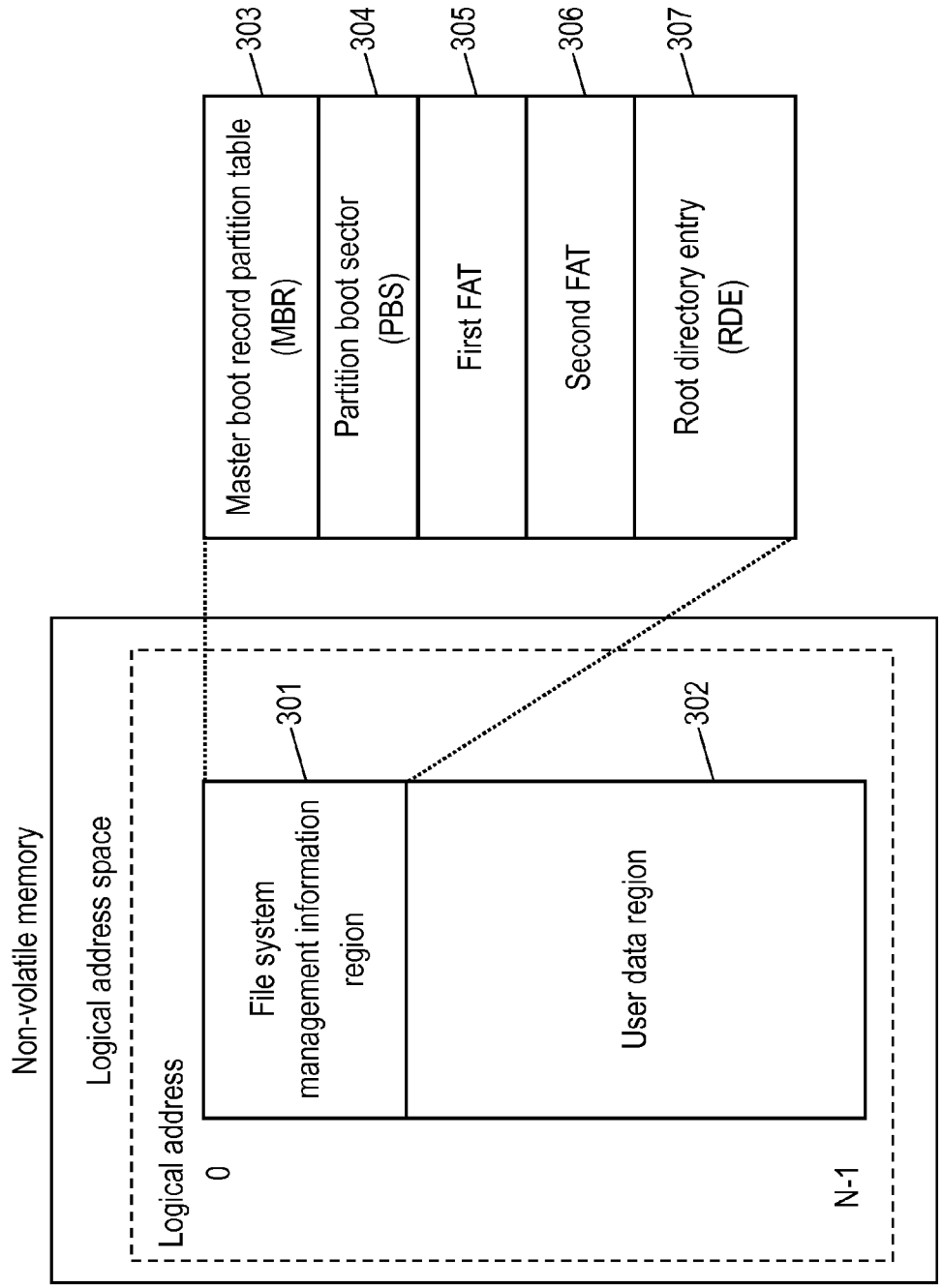
FIG. 4 is a configuration diagram of a FAT (File Allocation Table) file system according to the first exemplary embodiment.

FIG. 4 is a configuration diagram of the FAT file system. The FAT file system includes types of FAT 12 (a FAT using a cluster identifier of 12 bits), FAT 16 (a FAT using a cluster identifier of 16 bits) and FAT 32 (a FAT using a cluster identifier of 32 bits) based on differences between bit widths of management units. However, a region management method using the FAT is the same, and therefore FAT 16 will be described below as an example. As shown in FIG. 4, the FAT file system includes file system management information region 301 which is a region in which management information of a file system such as a region allocation unit and a size of a region managed by the file system are stored at a head of a logical address space, and user data region 302 which is a region in which there are actual file data and a directory.

File system management information region 301 includes file system management information called master boot record partition table 303, partition boot sector 304, first FAT 305, second FAT 306 and root directory entry 307, and file system management information is information required to manage user data region 302. Master boot record partition table 303 is a region in which information, for dividing a region on a logical address managed by the file system into a plurality of regions called partitions and for managing the region, is stored. Partition boot sector 304 is a region in which management information of one partition, such as a size of a region management unit of a partition, is stored. First FAT 305 and second FAT 306 are regions, in which information related to a storage position of data included in a file, is stored. Generally, two FATs including the same information are dually provided to allow second FAT 306 which is one FAT to access to a file even when, for example, first FAT 305 which is the other FAT is corrupted. Root directory entry 307 is a region in which a file and directory information (directory entry), just below a root directory, are stored.

User data region 302 is divided and managed per management unit called a cluster having a size of about 512 bytes to 32 KB, and data included in a file is stored in each cluster. Data included in a file including multiple items is stored over a plurality of clusters, and a connection between the clusters is managed by link information stored in first FAT 305 and second FAT 306. Further, a directory entry, which is information of a file and a subdirectory in a directory just below a root directory, is stored using part of this user data region 302.

Figure 5:
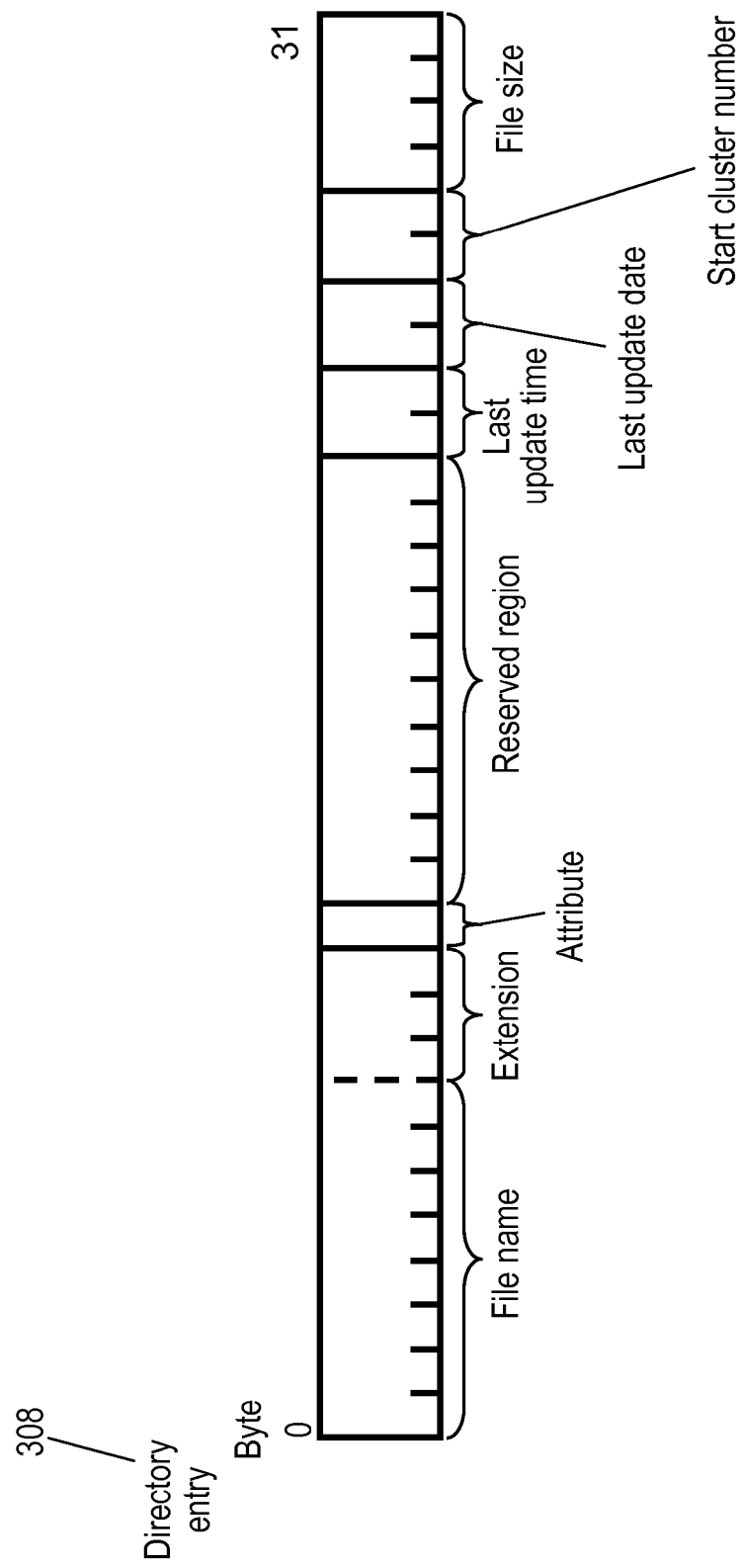
FIG. 5 is a configuration diagram of a directory entry according to the first exemplary embodiment.

FIG. 5 is a configuration diagram of a directory entry of FAT 16. Directory entry 308 of 32 bytes is allocated per file and directory, and information related to the file and the directory is stored in directory entry 308. That is, information of directory entry 308 of 32 bytes is newly created every time one file or one directory is added, and is stored in a region of root directory entry 307 or user data region 302. In 8 bytes at a head of directory entry 308, names of the file or the directory is stored. In subsequent 3 bytes, an extension of the file or the directory is stored. In subsequent 1 byte, attribute information such as a flag for identifying a type of the file/directory, a flag for identifying whether or not the file/directory is read-only or the like is stored. Further, there is a reserved region, and then information of a last update date of the file/directory, a start cluster number indicating a start position of a cluster in which an entity of file/directory data is stored, and a number of bytes of a file size are stored.

Thus, directory entry 308 holds only information related to the position of the cluster in which the head data of the file is stored, and therefore, when file data is stored over a plurality of clusters, the position information of the clusters is held in first FAT 305 and second FAT 306. That is, to update a file, file data needs to be written and information of directory entry 308, first FAT 305 and second FAT 306 also need to be written.

Figure 6A:
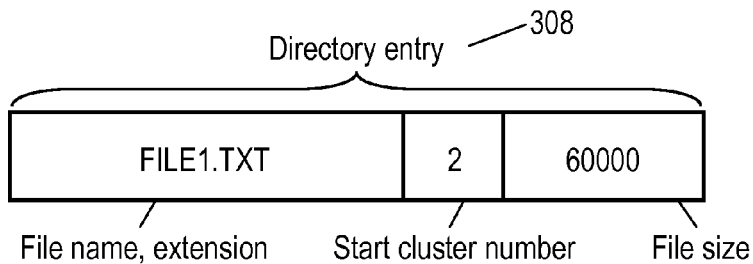
FIG. 6A is a view illustrating an example of a directory entry of the FAT file system according to the first exemplary embodiment.
Figure 6B:
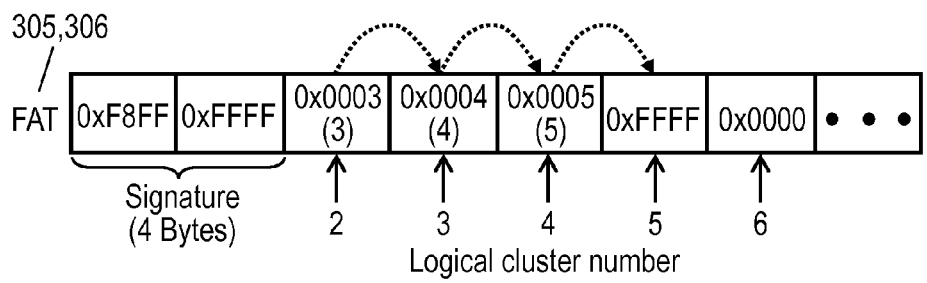
FIG. 6B is a view illustrating an example of a first FAT and a second FAT of the FAT file system according to the first exemplary embodiment.
Figure 6C:
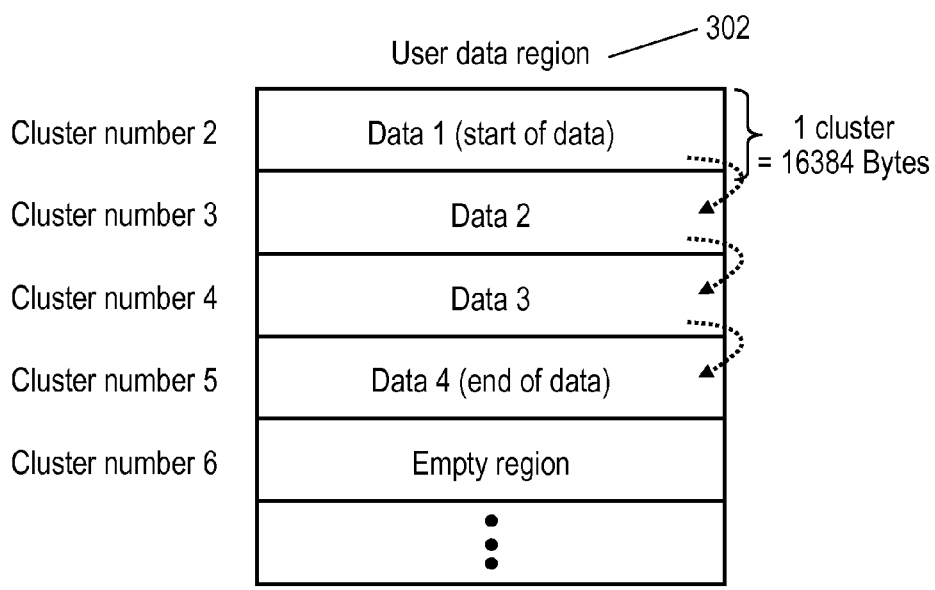
FIG. 6C is a view illustrating an example of a user data region of the FAT file system according to the first exemplary embodiment.

FIGS. 6A, 6B and 6C are explanatory views illustrating an example of file system management information and user data in the FAT file system of FAT 16. FIG. 6A is an example of directory entry 308, and shows that a file having a size of 60000 bytes with a name of "FILE1.TXT" is stored. Further, FIG. 6A shows that a data body of this file is stored in a region whose logical cluster number starts from 2. FIG. 6B is an example of first FAT 305 and second FAT 306 of FAT 16. In four bytes at heads of first FAT 305 and second FAT 306, fixed values are stored as signatures. However, the other regions are associated with logical clusters in each user data region 302 in 16 bit units. For example, 16 bits immediately after the signatures at the heads of first FAT 305 and second FAT 306 are associated with logical cluster number 2 and subsequent 16 bits are associated with logical cluster number 3, and 16 bits are each associated with logical cluster numbers in ascending order. A value stored in each 16 bit indicates a state of the associated logical cluster number. For example, 0x0000 means that a region of an associated logical cluster number is an empty cluster. From 0x0002 to 0xFFF6 mean logical cluster numbers of next regions linked to regions of associated logical cluster numbers. From 0xFFF8 to 0xFFFF mean that regions of associated logical cluster numbers are ends of links.

In FIG. 6B, that is, an example of first FAT 305 and second FAT 306 indicates that the data body of "FILE1.TXT" is stored in regions of cluster numbers 2, 3, 4 and 5. Further, in FIG. 6C, an example of user data region 302 indicates that the data body of "FILE1.TXT" is actually stored in the regions of logical cluster numbers 2, 3, 4 and 5.

Thus, in the FAT file system, first FAT 305 and second FAT 306 manage user data region 302, and, in the present exemplary embodiment, FS transfer list 121 is generated based on first FAT 305 and second FAT 306 and is used for file copy operation.

Figure 7:
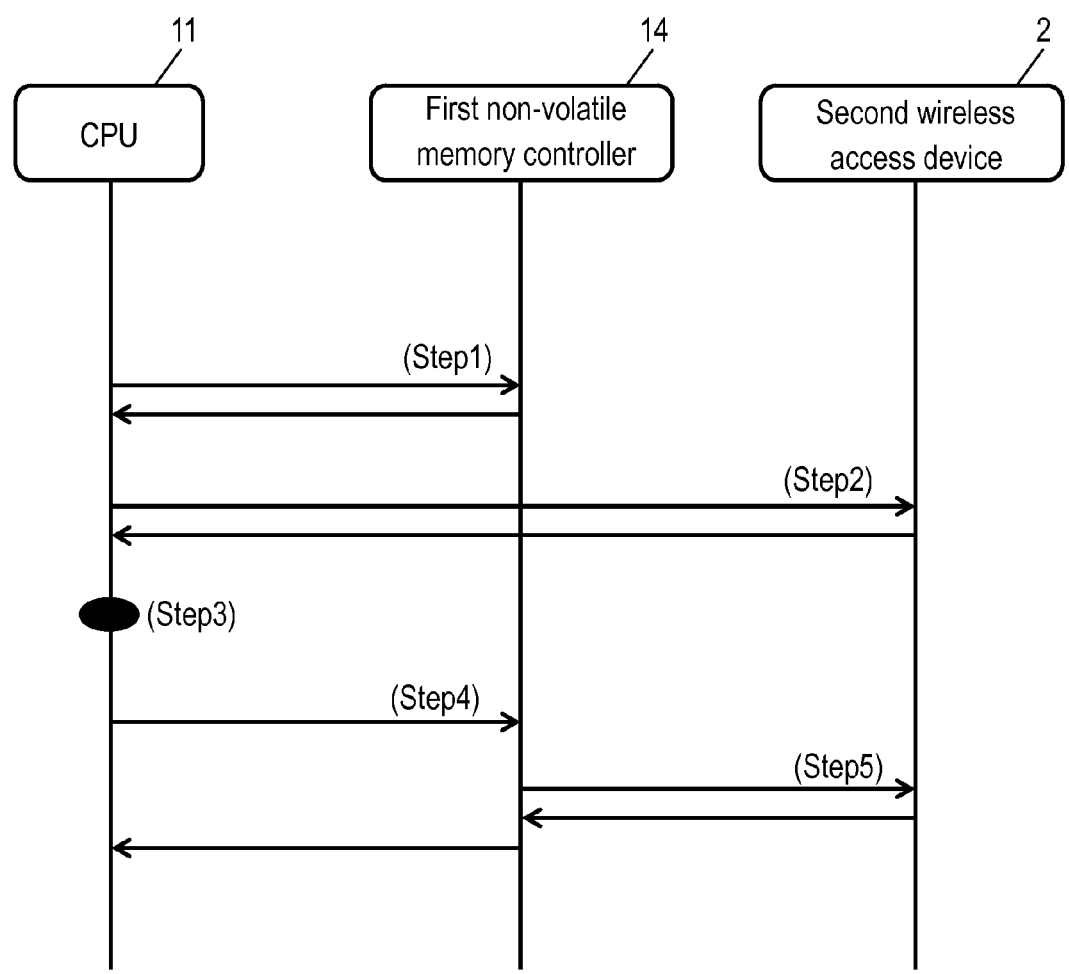
FIG. 7 is a flowchart illustrating an outline of a file copy operation procedure according to the first exemplary embodiment.

Next, an outline of the file copy operation according to the present exemplary embodiment will be described. FIG. 7 is a view illustrating a flowchart of the file copy operation procedure. Upon the file copy operation according to the present exemplary embodiment, file copy controller 134 which operates on CPU 11, first non-volatile memory controller 14 and second non-volatile memory controller 24 in second wireless access device 2 copy files at a high speed from first non-volatile memory 15 to second non-volatile memory 25 or from second non-volatile memory 25 to first non-volatile memory 15 using FS transfer list 121. The file copy operation according to the present exemplary embodiment includes the following five steps.

(Step 1) File copy controller 134 which operates on CPU 11 reads file system management information from first non-volatile memory 15 through first non-volatile memory controller 14. With this, file copy controller 134 identifies a logical address at which a data body of a transfer source file existing on first non-volatile memory 15 is stored or a logical address of an empty cluster used to store data of a transfer destination file on first non-volatile memory 15.

(Step 2) File copy controller 134 which operates on CPU 11 reads file system management information from second non-volatile memory 25 through second non-volatile memory controller 24. With this, file copy controller 134 identifies a logical address of an empty cluster used to store data of a transfer destination file on the second non-volatile memory 25 or a logical address in which a data body of a transfer source file existing on second non-volatile memory 25.

(Step 3) File copy controller 134 which operates on CPU 11 generates FS transfer list 121 based on the file system management information read in Step 1 and Step 2.

(Step 4) File copy controller 134 which operates on CPU 11 transmits FS transfer list 121 generated in Step 3 to first non-volatile memory controller 14, and instructs file copy operation. Subsequently, until the file copy operation is completed, first non-volatile memory controller 14 performs actual copy operation, and file copy controller 134 which operates on CPU 11 stands by until that the completion of the file copy operation is notified.

(Step 5) First non-volatile memory controller 14 receives FS transfer list 121 transmitted in Step 4, and actually performs data copy operation according to description contents.

Thus, in the file copy operation according to the present exemplary embodiment, file copy controller 134 which operates on CPU 11 generates FS transfer list 121, and first non-volatile memory controller 14 performs actual copy operation based on FS transfer list 121. With this, CPU 11 and first internal bus 17 are not involved in actually copying data, so that it is possible to copy files at a high speed without depending on performances of CPU 11 and first internal bus 17.

Figure 8:
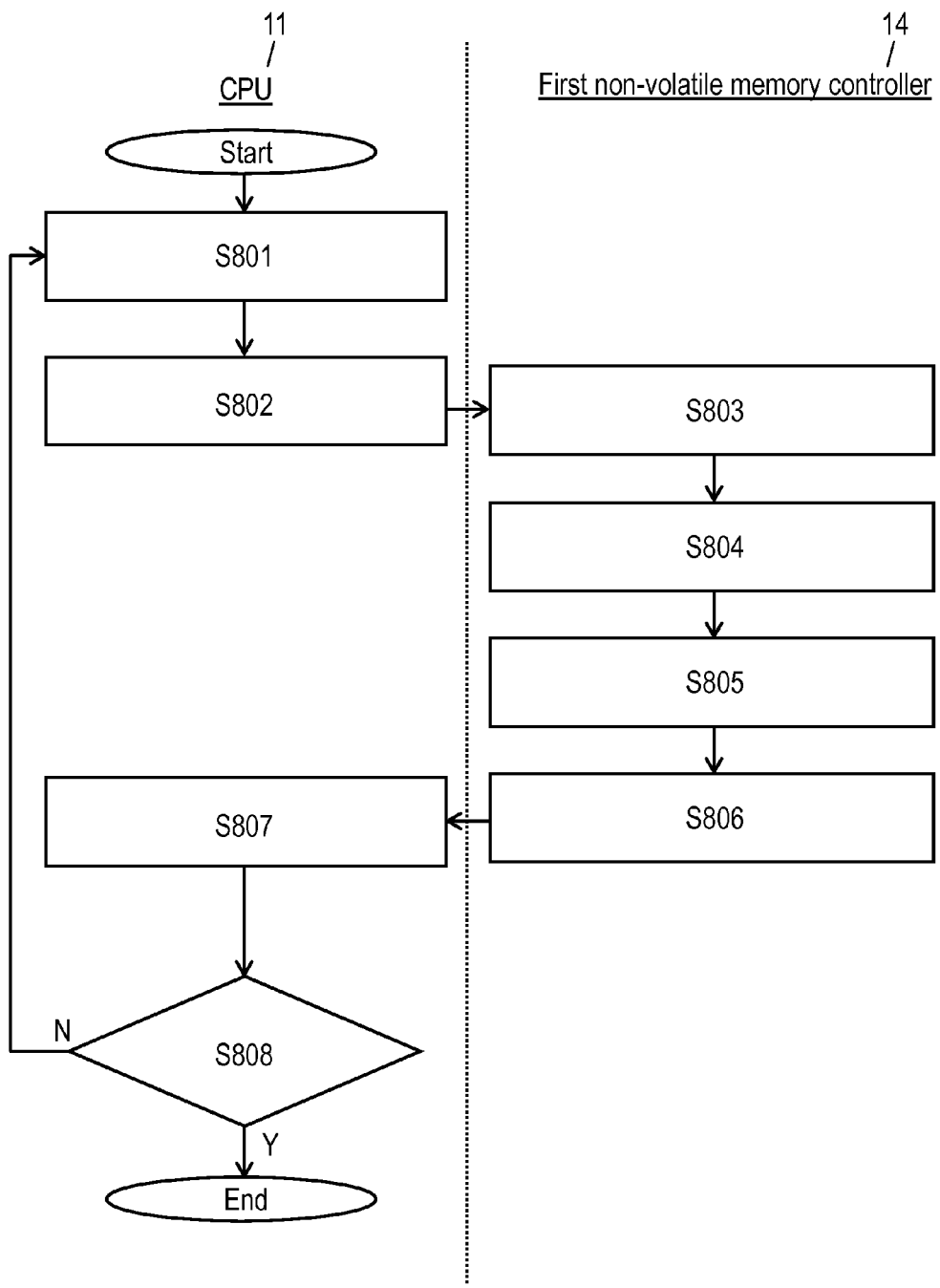
FIG. 8 is a flowchart illustrating a detail (Step 1) of the file copy operation procedure according to the first exemplary embodiment.

Next, a operation procedure of Step 1 will be described in detail with reference to FIG. 8. In operation in Step 1, file copy controller 134 which operates on CPU 11 and first non-volatile memory controller 14 read file system management information from first non-volatile memory 15. The operation in Step 1 is operation which is commonly applied both to copy a file from the local memory to the remote memory, that is, to copy a file from first non-volatile memory 15 to second volatile memory 25, and to copy a file from the remote memory to the local memory, that is, to copy a file from second non-volatile memory 25 to first non-volatile memory 15.

(S801) File copy controller 134 which operates on CPU 11 identifies a logical address on first non-volatile memory 15, from file system management information such as first FAT 305, second FAT 306 and directory entry 308. More specifically, file copy controller 134 first identifies as an access region a head region of the logical address space in which master boot record partition table 303 is stored.

(S802) File copy controller 134 which operates on CPU 11 issues a Read instruction with respect to the logical address identified by the operation in S801, to first non-volatile memory controller 14.

(S803) Sequencer 141 in first non-volatile memory controller 14 receives the Read instruction issued by the operation in S802, and generates a command packet for reading with respect to the identified logical address. A recording medium which is used for first non-volatile memory 15 is, for example, a SD (Secure Digital) memory card, a hard disk connected by a SATA (Serial Advanced Technology Attachment) connection method or the like. Further, a protocol for an access is defined in each recording medium.

Hereinafter, sequencer 141 generates a command packet required to perform read operation according to various protocols for accessing first non-volatile memory 15.

(S804) Sequencer 141 in first non-volatile memory controller 14 inputs the command packet generated by the operation in S803, to first memory controller 145.

(S805) First memory controller 145 in first non-volatile memory controller 14 transmits the inputted command packet to first non-volatile memory 15, and reads data from first non-volatile memory 15. The read data is stored in first memory data buffer 146.

(S806) Sequencer 141 in first non-volatile memory controller 14 notifies file copy controller 134 which operates on CPU that the Read operation has been completed.

(S807) File copy controller 134 which operates on CPU 11 transfers the read data from first memory data buffer 146 to RAM 12 in first wireless access device 1. With this operation, one operation of reading file system management information is completed.

(S808) File copy controller 134 which operates on CPU 11 checks whether or not reading all of file system management information to access a file has been completed. When reading the file system management information has not been completed, the flow returns to S801 and file copy controller 134 continues the operation of reading the file system management information. When reading the file system management information has been completed, the operation in Step 1 is completed. For example, in case of the FAT file system, to access a file, file copy controller 134 reads regions of master boot record partition table 303, partition boot sector 304, first FAT 305, second FAT 306 and root directory entry 307 in order and, if necessary, file copy controller 134 reads directory entry 308 of a subdirectory. The operation in S801 to S807 is repeatedly performed with respect to the file system management information to read these regions.

Figure 9:
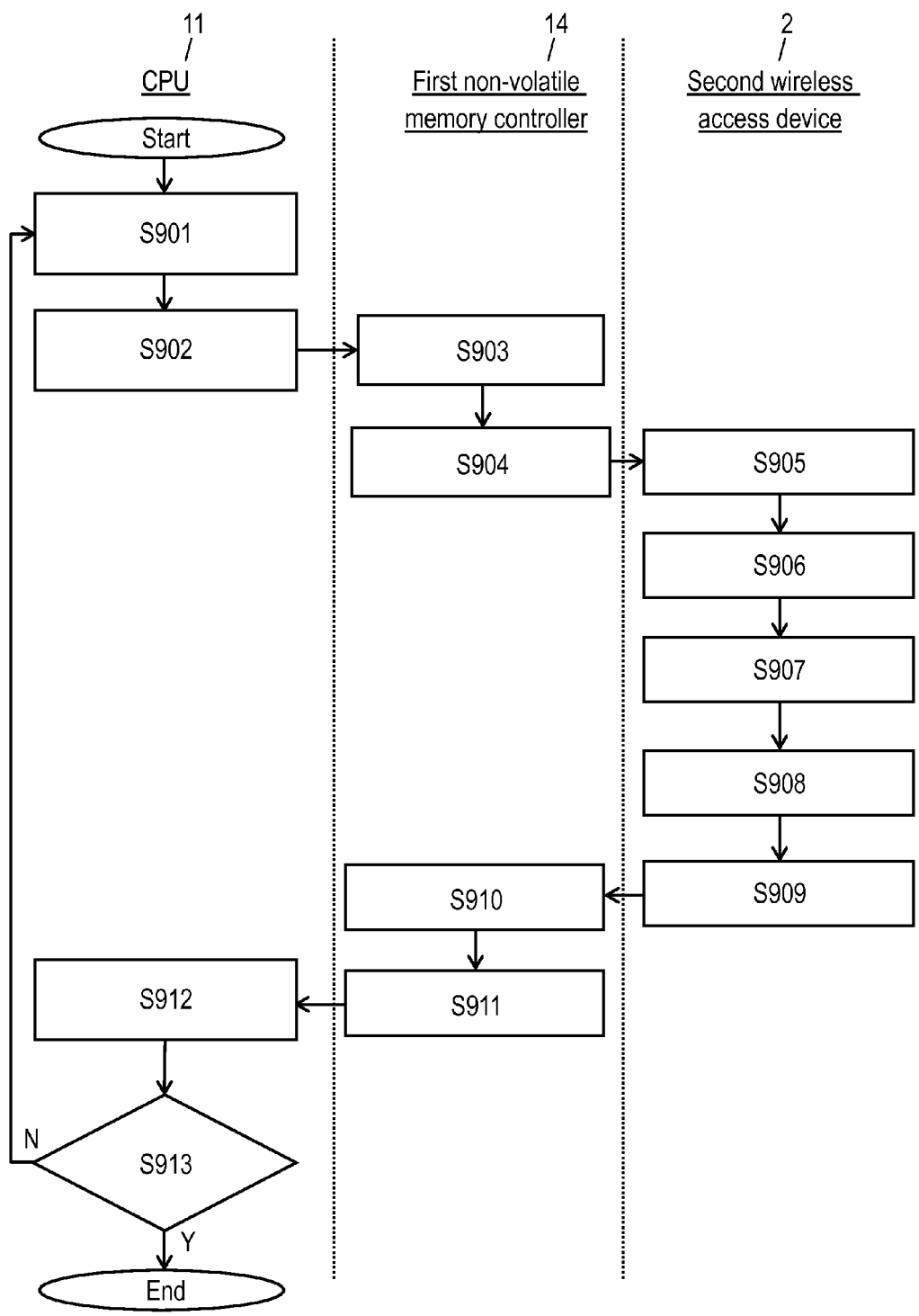
FIG. 9 is a flowchart illustrating a detail (Step 2) of the file copy operation procedure according to the first exemplary embodiment.

Next, a operation procedure of Step 2 will be described in detail with reference to FIG. 9. In the operation in Step 2, file copy controller 134 which operates on CPU 11, first non-volatile memory controller 14 and second wireless access device 2 read file system management information from second non-volatile memory 25. The operation in Step 2 is operation which is commonly applied both to copy a file from the local memory to the remote memory, that is, to copy a file from first non-volatile memory 15 to second volatile memory 25, and to copy a file from the remote memory to the local memory, that is, to copy a file from second non-volatile memory 25 to first non-volatile memory 15.

(S901) File copy controller 134 which operates on CPU 11 identifies a logical address on second non-volatile memory 25, from file system management information such as first FAT 305, second FAT 306 and directory entry 308. More specifically, file copy controller 134 first identifies as an access region a head region of the logical address space in which master boot record partition table 303 is stored.

(S902) File copy controller 134 which operates on CPU 11 issues a Read instruction with respect to the logical address identified in the operation by S901, to first non-volatile memory controller 14.

(S903) Sequencer 141 in first non-volatile memory controller 14 receives the Read instruction issued in the operation by S902, and generates a command packet for reading with respect to the identified logical address.

(S904) Sequencer 141 in first non-volatile memory controller 14 generates a wireless packet including the command packet generated in the operation by S903 in a payload, and transmits the wireless packet to second wireless access device 2 through first wireless circuit 16.

(S905) Sequencer 241 in second non-volatile memory controller 24 receives the wireless packet wirelessly transmitted by the operation in S904, through second wireless circuit 26, extracts the command packet (Read packet) which is stored in the payload of the wireless packet, and inputs the command packet to second memory controller 245.

(S906) Second memory controller 245 in second non-volatile memory controller 24 transmits the inputted command packet to second non-volatile memory 25, and reads data from second non-volatile memory 25. The read data is stored in second memory data buffer 246.

(S907) Sequencer 241 in second non-volatile memory controller 24 generates a wireless packet including data read in the operation by S906 in a payload on second memory data buffer 246.

(S908) Sequencer 241 in second non-volatile memory controller 24 controls DMA controller 242 to DMA-transfer the wireless packet generated by the operation in S907 from second memory data buffer 246 to second wireless data buffer 261.

(S909) Sequencer 241 in second non-volatile memory controller 24 transmits the wireless packet existing on second wireless data buffer 261, to first wireless access device 1 through second wireless circuit 26.

(S910) First wireless circuit 16 receives the wireless packet transmitted from second wireless access device 2 by the operation in S909 and stores the received wireless packet in first wireless data buffer 161. Subsequently, sequencer 141 in first non-volatile memory controller 14 controls DMA controller 142 to DMA-transfer Read data stored in a payload of the wireless packet on first wireless data buffer 161, to first memory data buffer 146.

(S911) Sequencer 141 in first non-volatile memory controller 14 notifies file copy controller 134 which operates on CPU 11 that the Read operation has been completed.

(S912) File copy controller 134 which operates on CPU 11 transfers the Read data from first memory data buffer 146 to RAM 12 in first wireless access device 1. With this operation, one operation of reading file system management information is completed.

(S913) File copy controller 134 which operates on CPU 11 checks whether or not reading all of file system management information to access a file has been completed. When reading the file system management information has not completed, the flow returns to S901 and file copy controller 134 continues the operation of reading the file system management information. When reading the file system management information has been completed, the operation in Step 2 is completed.

Figure 10:
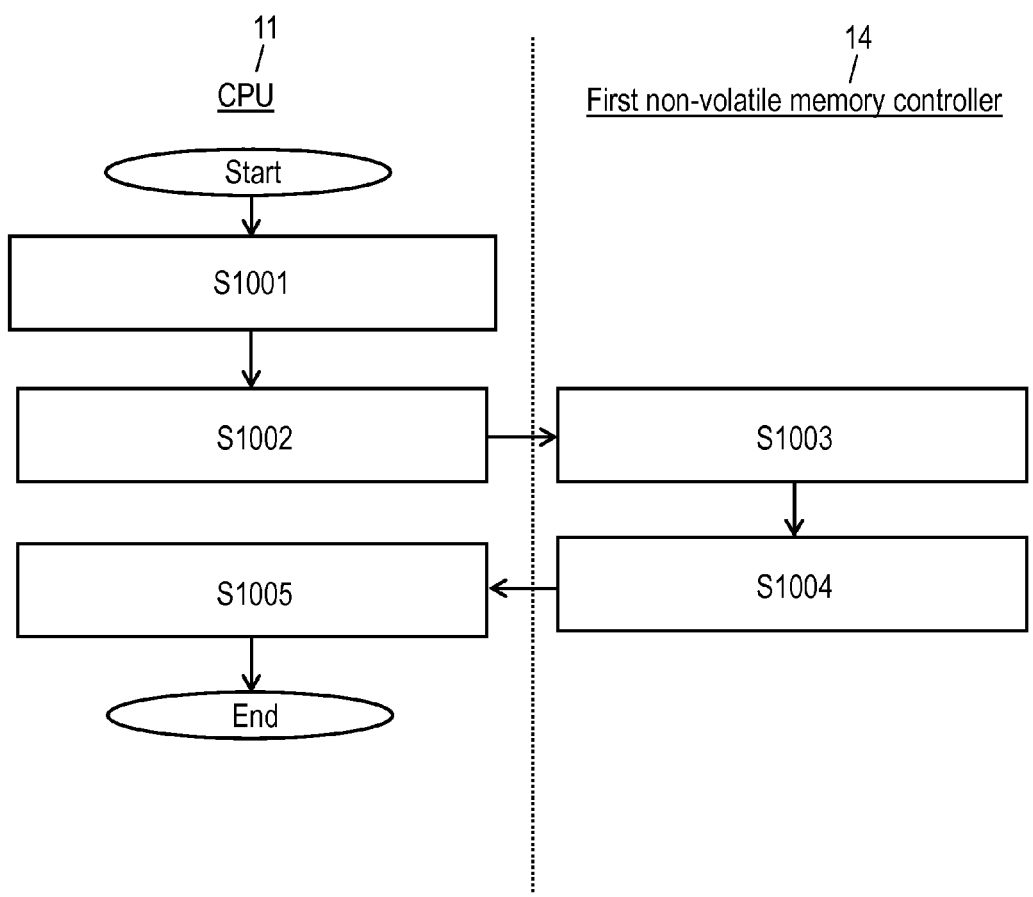
FIG. 10 is a flowchart illustrating details (Steps 3 to 5) of the file copy operation procedure according to the first exemplary embodiment.

Next, operation procedures of Step 3 to Step 5 will be described in detail with reference to FIG. 10. In the operation in Step 3 to Step 5, file copy controller 134 which operates on CPU 11 generates FS transfer list 121 based on the file system management information read in Step 1 and Step 2 and inputs FS transfer list 121 to first non-volatile memory controller 14, and then first non-volatile memory controller 14 actually performs data copy operation. Except for details of the operation in Step 5, the operation described with reference to FIG. 10 is operation which is commonly applied both to copy a file from the local memory to the remote memory, that is, to copy a file from first non-volatile memory 15 to second volatile memory 25, and to copy a file from the remote memory to the local memory, that is, to copy a file from second non-volatile memory 25 to first non-volatile memory 15.

(S1001) File copy controller 134 which operates on CPU 11 generates FS transfer list 121 based on the file system management information read in Step 1 and Step 2.

FIG. 13 is a view illustrating an example of FS transfer list 121. As shown in FIG. 13, FS transfer list 121 is a list including transfer directions indicating transfer directions of a copy destination and a copy source, logical addresses of regions in which file data of the copy destination and the copy source are stored, and numbers of transfer clusters indicating transfer sizes. The transfer directions include two types of "L to R" and "R to L". "L to R" means a copy from first non-volatile memory 15 which is the local memory to second non-volatile memory 25 which is the remote memory, and "R to L" means a copy from second non-volatile memory 25 which is the remote memory to first non-volatile memory 15 which is the local memory. The transfer source logical address indicates a start logical address of a region in which file data of the copy source is stored. The transfer destination logical address indicates a start logical address of a region in which file data of the copy destination is stored. The number of transfer clusters indicates a size of data to be copied as a number of clusters. FIG. 13 shows an example where transfer source logical addresses, transfer destination logical addresses and the numbers of transfer clusters are managed in cluster units such as 32 KB which are logical region management units of the file system. However, the transfer source logical addresses, transfer destination logical addresses and the numbers of transfer clusters only need to be information which makes it possible to indicate a copy region, and may be managed in sector units such as 512 B which are minimum access units of a non-volatile memory other than clusters.

Next, a generation procedure of FS transfer list 121 will be described with reference to FIGS. 11 and 12. FIG. 11 shows an example of first FAT 305 and second FAT 306 included in the FAT file system constructed on first non-volatile memory 15 which is the transfer source, that is, the local memory. FIG. 12 shows an example of first FAT 305 and second FAT 306 of the FAT file system constructed on second non-volatile memory 25 which is the transfer destination, that is, the remote memory. Further, data of a file to be transferred is stored on a series of links which start from a logical address region of logical cluster number "0x0002" and end at a logical address region of "00010". First, file copy controller 134 calculates one continuous region length which starts from copy start positions of first FAT 305 and second FAT 306 of the transfer source. In case of FIG. 11, one continuous region length is the number of clusters "3 clusters" whose logical cluster numbers are "0x0002" to "0x0004". Next, file copy controller 134 calculates one continuous empty region length from heads of first FAT 305 and second FAT 306 of the transfer destination. In case of FIG. 12, one continuous empty region length is the number of clusters "2 clusters" whose logical cluster numbers are "0x0003" and "0x0004". Subsequently, file copy controller 134 compares the continuous region length in FIG. 11 and the continuous empty region length in FIG. 12 and, a smaller length is identified as the number of transfer clusters for one time. In the above example, the "2 clusters" of the continuous empty region length, which is the smaller numerical value, in FIG. 12 is the number of transfer clusters for one time. Finally, these values are written in FS transfer list 121, and the same operation continues until the end of the transfer source file. More specifically, as shown in FIG. 13, in a first row of FS transfer list 121, the transfer direction "L to R", the transfer source logical address "0x0002", the transfer destination logical address "0x0003" and the number of transfer clusters "2" are stored. In a second row, the transfer direction "L to R", the transfer source logical address "0x0004", the transfer destination logical address "0x0008" and the number of transfer clusters "1" are stored as values obtained upon retrieval from a subsequent region. Subsequently, values are added to FS transfer list 121 likewise until the transfer source logical address becomes "0x0010".

(S1002) File copy controller 134 which operates on CPU 11 transmits FS transfer list 121 generated by the operation in S1001, to first non-volatile memory controller 14, and instructs copying. Subsequently, copy operation is performed by first non-volatile memory controller 14, and file copy controller 134 which operates on CPU 11 stands by until the file copy operation is completed.

(S1003) First non-volatile memory controller 14 analyzes content of FS transfer list 121 transmitted by the operation in S1002, and actually performs copy operation. The copy operation will be described in detail later.

(S1004) When the copy operation in S1003 is completed, first non-volatile memory controller 14 notifies file copy controller 134 which operates on CPU 11 that the copy operation has been completed.

(S1005) When file copy controller 134 which operates on CPU 11 receives a copy operation completion notice notified by the operation in S1004, file copy controller 134 recognizes that the copy operation has been completed, and terminates the processing.

Thus, in the file copy operation according to the present exemplary embodiment, file copy controller 134 which operates on CPU 11 performs copy operation of up to generation of FS transfer list 121, and first non-volatile memory controller 14 performs subsequent actual copy operation. With this, CPU 11 and first internal bus 17 are not involved in actual copy operation, so that it is possible to copy files at a high speed such that the copy operation speed does not depend on performances of CPU 11 and first internal bus 17.

Further, only copying a file data body has been described as to explanation of the above file copy. However, information related to a copy destination file is actually written in first FAT 305, second FAT 306 and directory entry 308 existing in the non-volatile memory of the copy destination. Operation of updating file system management information is the same as conventional operation of updating file system management information in file system controller 132, and therefore will not be described in detail. It is only necessary to perform the operation of updating file system management information at timing before or after the file copy operation described with reference to FIG. 10.

Figure 14:
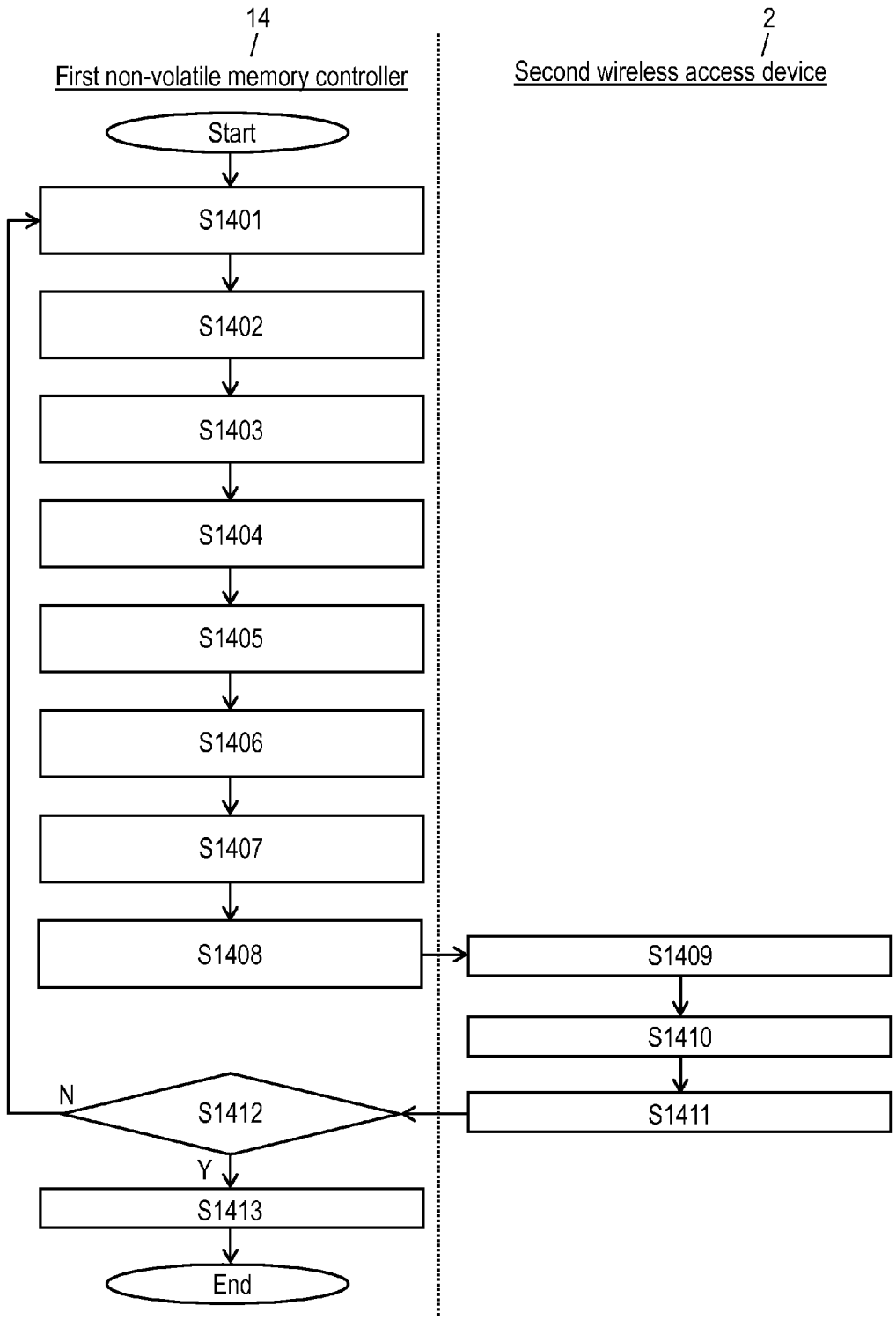
FIG. 14 is a flowchart illustrating details of the file copy operation procedure (copying from a local memory to a remote memory) using the FS transfer list according to the first exemplary embodiment.

Subsequently, details of a operation procedure in a case where copying is performed from first non-volatile memory 15 which is the local memory to second non-volatile memory 25 which is the remote memory in the copy operation using FS transfer list 121 in Step 5 will be described with reference to FIG. 14.

(S1401) Sequencer 141 in first non-volatile memory controller 14 refers to FS transfer list 121 from the head in row units, and checks the transfer direction. In the example of FS transfer list 121 in FIG. 13, the transfer direction in the first row is "L to R", and sequencer 141 recognizes a copy from the local memory to the remote memory.

(S1402) Sequencer 141 in first non-volatile memory controller 14 reads data from the local memory since the transfer direction checked in S1401 is a copy from the local memory to the remote memory. Hence, sequencer 141 checks the transfer source logical address on FS transfer list 121, and generates a necessary command packet to perform reading with respect to a logical address targeting at the local memory.

(S1403) Sequencer 141 in first non-volatile memory controller 14 inputs the command packet generated by the operation in S1402, to first memory controller 145.

(S1404) First memory controller 145 in first non-volatile memory controller 14 transmits the inputted command packet to first non-volatile memory 15, and reads data from first non-volatile memory 15. The read data is stored in first memory data buffer 146.

(S1405) Sequencer 141 in first non-volatile memory controller 14 writes data in the remote memory since the transfer direction checked in S1401 is a copy from the local memory to the remote memory. Hence, sequencer 141 checks the transfer destination logical address on FS transfer list 121, and generates a command packet to perform writing with respect to a logical address targeting at the remote memory.

(S1406) Sequencer 141 in first non-volatile memory controller 14 generates a wireless packet including the data read in S1404 and the command packet generated by the operation in S1405 in a payload on first memory data buffer 146.

(S1407) Sequencer 141 in first non-volatile memory controller 14 controls DMA controller 142 to DMA-transfer the wireless packet generated in S1406 to first wireless data buffer 161.

(S1408) Sequencer 141 in first non-volatile memory controller 14 transmits the wireless packet transferred to first wireless data buffer 161 in S1407, to second wireless access device 2 through first wireless circuit 16.

(S1409) When second wireless circuit 26 receives the wireless packet transmitted from first wireless access device 1 by the operation in S1408, second wireless circuit 26 stores the received wireless packet in second wireless data buffer 261. Subsequently, sequencer 241 in second non-volatile memory controller 24 controls DMA controller 242 to DMA-transfer data stored in a payload in the wireless packet on second wireless data buffer 261, to second memory data buffer 246.

(S1410) Sequencer 241 in second non-volatile memory controller 24 extracts the command packet (Write packet) which is stored in the payload of the wireless packet transmitted from first wireless access device 1 by the operation in S1408, and inputs the command packet to second memory controller 245.

(S1411) Second memory controller 245 in second non-volatile memory controller 24 transmits the inputted command packet to second non-volatile memory 25, and writes the data stored in second memory data buffer 246, in second non-volatile memory 25. Further, second memory controller 245 generates the wireless packet including a Write completion notice after completing writing, and transmits the wireless packet to first wireless access device 1 through second wireless circuit 26.

(S1412) When first wireless circuit 16 receives the wireless packet transmitted from second wireless access device 2 by the operation in S1411 and sequencer 141 in first non-volatile memory controller 14 recognizes that Write is completed, sequencer 141 checks whether or not there is an unprocessed list in FS transfer list 121. When operation does not come to the end of FS transfer list 121 and there is the unprocessed list, the flow returns to the operation in S1401 and sequencer 141 continues operation with respect to the rest of the list. When there is not the unprocessed list at the end of FS transfer list 121, the flow moves to the operation in S1413.

(S1413) Sequencer 141 in first non-volatile memory controller 14 notifies file copy controller 134 which operates on CPU 11 that copy operation has been completed, and terminates the operation.

Figure 15:
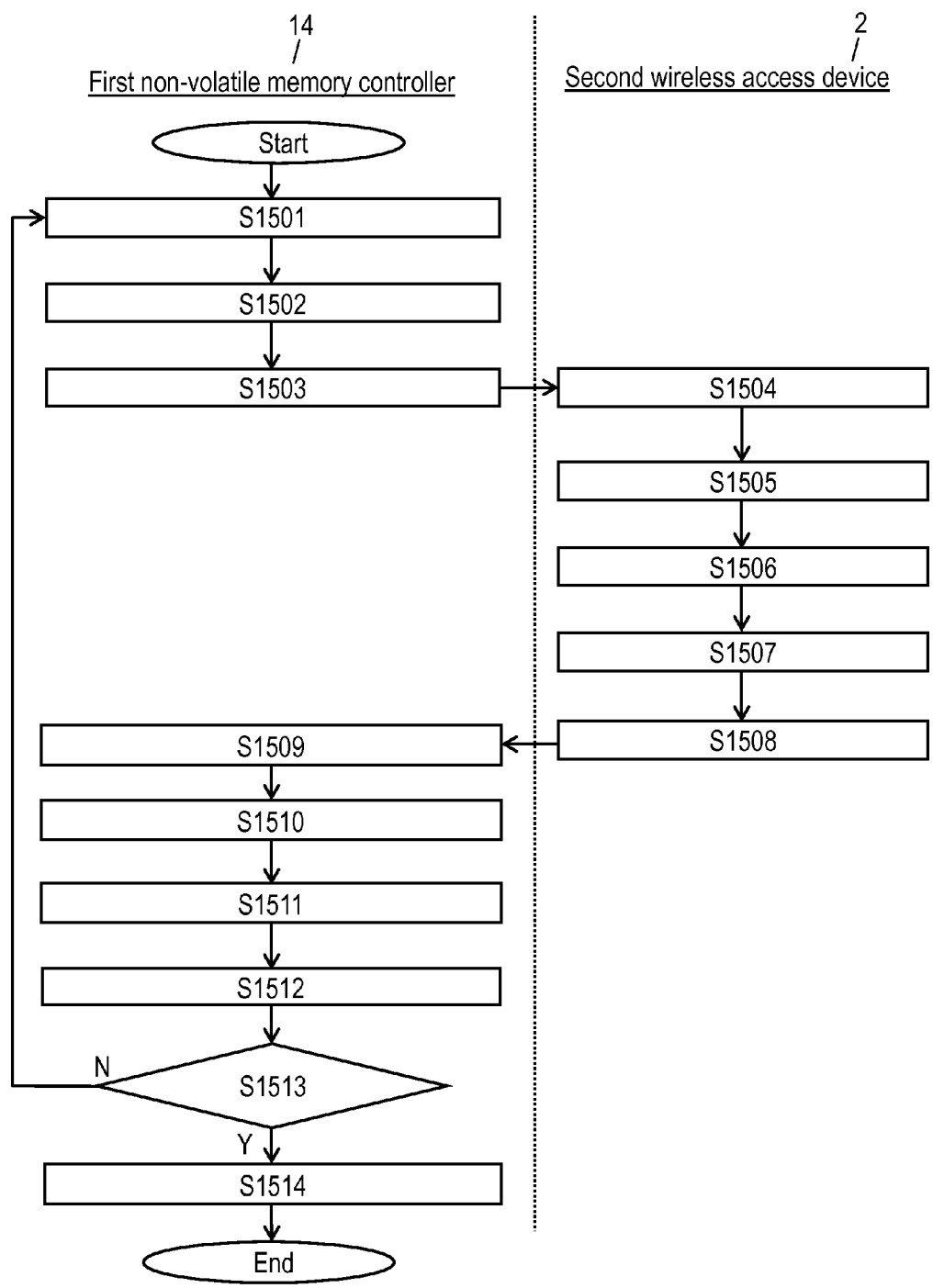
FIG. 15 is a flowchart illustrating details of the file copy operation procedure (copying from the remote memory to the local memory) using the FS transfer list according to the first exemplary embodiment.

Subsequently, details of a operation procedure in a case where copying is performed from second non-volatile memory 25 which is the remote memory to first non-volatile memory 15 which is the local memory in the copy operation using FS transfer list 121 in Step 5 will be described with reference to FIG. 15.

(S1501) Sequencer 141 in first non-volatile memory controller 14 refers to FS transfer list 121 from the head in row units, and checks the transfer direction. Assume a case where "R to L" is stored as the transfer direction and copying is performed from the remote memory to the local memory.

(S1502) Sequencer 141 in first non-volatile memory controller 14 reads data from the remote memory since the transfer direction checked in S1501 is a copy from the remote memory to the local memory. Hence, sequencer 141 checks the transfer source logical address on FS transfer list 121, and generates a command packet to perform reading with respect to a logical address targeting at the remote memory.

(S1503) Sequencer 141 in first non-volatile memory controller 14 generates a wireless packet including the command packet generated by the operation in S1502 in a payload, and transmits the wireless packet to second wireless access device 2 through first wireless circuit 16.

(S1504) When second wireless circuit 26 receives the wireless o packet transmitted from first wireless access device 1 by the operation in S1503, second wireless circuit 26 stores the received wireless packet in second wireless data buffer 261. Subsequently, sequencer 241 in second non-volatile memory controller 24 extracts the command packet (Read packet) which is stored in the payload portion in the wireless packet, and inputs the command packet to second memory controller 245.

(S1505) Second memory controller 245 in second non-volatile memory controller 24 transmits the inputted command packet to second non-volatile memory 25, and reads the data to second memory data buffer 246, from second non-volatile memory 25.

(S1506) Sequencer 241 in second non-volatile memory controller 24 converts on second memory data buffer 246 the data read by the operation in S1505 into a wireless packet.

(S1507) Sequencer 241 in second non-volatile memory controller 24 controls DMA controller 242 to DMA-transfer the wireless packet on second memory data buffer 246 to second wireless data buffer 261.

(S1508) Sequencer 241 in second non-volatile memory controller 24 transmits the wireless packet on second wireless data buffer 261 to first wireless access device 1 through second wireless circuit 26.

(S1509) When first wireless circuit 16 receives the wireless packet transmitted from second wireless access device 2 by the operation in S1508, first wireless circuit 16 stores the received wireless packet in first wireless data buffer 161. Subsequently, sequencer 141 in first non-volatile memory controller 14 extracts the data stored in the payload of the wireless packet, and controls DMA controller 142 to DMA-transfer the data to first memory data buffer 146.

(S1510) Sequencer 141 in first non-volatile memory controller 14 writes data in the local memory since the transfer direction checked in S1501 is a copy from the remote memory to the local memory. Hence, sequencer 141 checks the transfer destination logical address on FS transfer list 121, and generates a command packet to perform writing with respect to a logical address targeting at the local memory.

(S1511) Sequencer 141 in first non-volatile memory controller 14 inputs the command packet (Write command) generated by the operation in S1510, to first memory controller 145.

(S1512) First memory controller 145 in first non-volatile memory controller 14 transmits the inputted command packet to first non-volatile memory 15, and writes the Read data stored in first memory data buffer 146, in first non-volatile memory 15.

(S1513) Sequencer 141 in first non-volatile memory controller 14 checks whether or not there is an unprocessed list in FS transfer list 121 after the write operation in S1512 is completed. When operation does not come to the end of FS transfer list 121 and there is the unprocessed list, the flow returns to the operation in S1501 and sequencer 141 continues operation with respect to the rest of the list. When there is not the unprocessed list at the end of FS transfer list 121, the flow moves to the operation in S1514.

(S1514) Sequencer 141 in first non-volatile memory controller 14 notifies file copy controller 134 which operates on CPU 11 that copy operation has been completed, and terminates the operation.

Thus, in the copy operation using FS transfer list 121 according to the present exemplary embodiment, first non-volatile memory controller 14 autonomously performs copy operation from the local memory to the remote memory in accordance with contents of FS transfer list 121.

As described above, when files are copied between the local memory and the remote memory in the wireless access device according to the present exemplary embodiment, file copy controller 134 which operates on CPU 11 in the wireless access device generates FS transfer list 121 and inputs FS transfer list 121 to first non-volatile memory controller 14, and first non-volatile memory controller 14 performs subsequent actual copy operation based on inputted FS transfer list 121. With this, CPU 11 and first internal bus 17 are not involved in actual copy operation, so that it is possible to copy files at a high speed such that the copy operation speed does not depend on performances of CPU 11 and first internal bus 17.

In addition, the present disclosure has been described based on the above exemplary embodiment. However, the present disclosure is not limited to the above exemplary embodiment. The exemplary embodiment can be changed without departing from the spirit of the present disclosure. The numerical values described in the present exemplary embodiment are exemplary, and other values may be used.

Further, a configuration where single first wireless access device 1 includes CPU 11 in which file copy controller 134 operates and first non-volatile memory controller 14 has been described with reference to FIG. 1. The other configuration may be employed.

Figure 16:
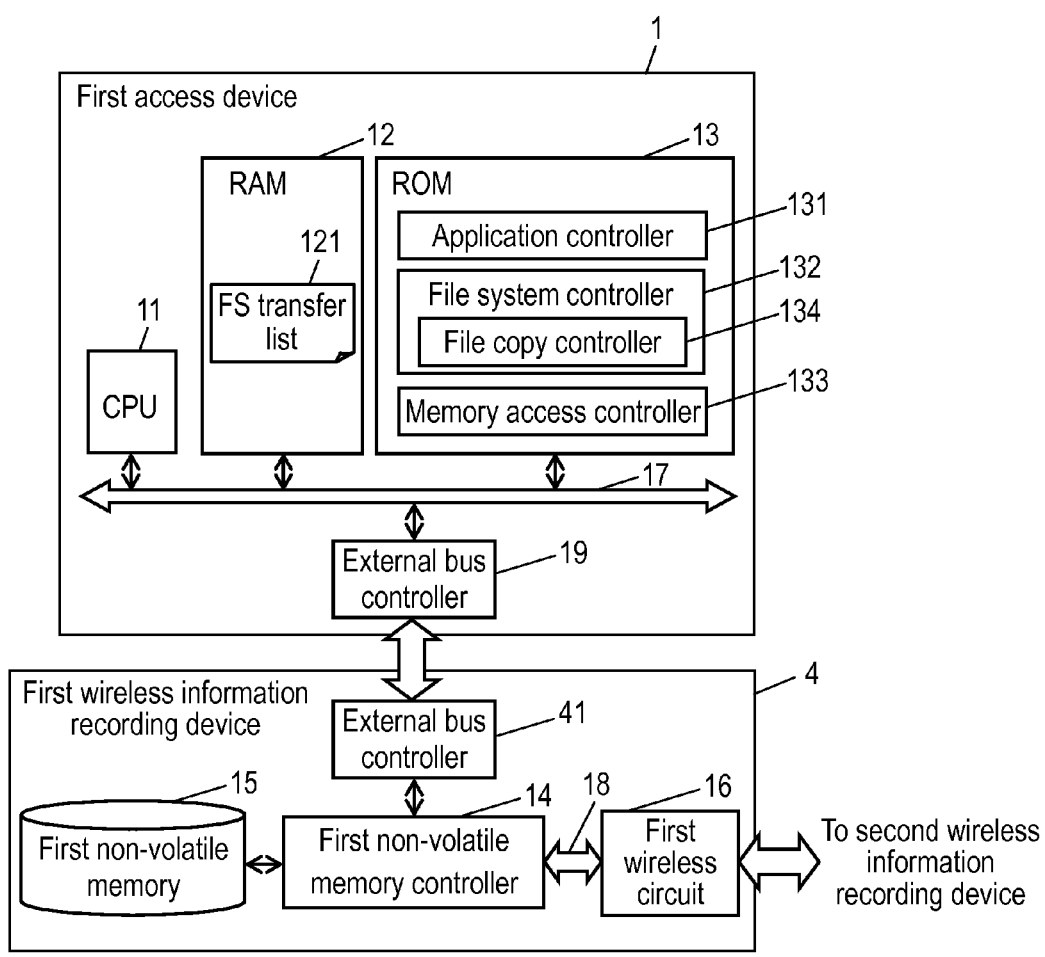
FIG. 16 is an explanatory view illustrating a configuration of another example of a wireless access device according to the first exemplary embodiment.

For example, first access device 1 is separately configured as first access device 3 and first wireless information recording device 4 as shown in FIG. 16. More specifically, first wireless access device 3 includes CPU 11, RAM 12, ROM 13 and external bus controller 19 which are connected with each other through first internal bus 17. First wireless information recording device 4 further includes first non-volatile memory 15 and external bus controller 41 connected to first non-volatile memory controller 14, and first wireless circuit 16 connected through second internal bus 18. External bus controller 19 and external bus controller 41 are external bus controllers such as USBs (Universal Serial Bus) or PCI Expresses (Peripheral Component Interconnect Express), through which first access device 3 and first wireless information recording device 4 may be configured to be connected.

With this configuration, by installing in ROM 13 software corresponding to file copy controller 134, the first access device 3 can appropriate a hardware configuration of the conventional access device as it is and be applied to the present disclosure.

Further, FS transfer list 121 in FIG. 13 has been described as an example. As long as sufficient information to enable data to be copied between the local memory and the remote memory is included, FS transfer list 121 is not limited to this format and may be adopt another format.

For example, FS transfer list 122 as shown in FIG. 17 may be used. As shown in FS transfer list 122, one transfer source region may be associated with two or more transfer destination regions such that data is copied. For example, FIG. 17 shows an example where n is 2. As information included in list number 1, logical address regions of transfer sources of three continuous clusters starting from "0x0002" are associated with logical address regions of transfer destinations of two continuous clusters starting from "0x0003" and a logical address region of a transfer destination of one cluster of "0x0008".

As another example, FS transfer list 123 as shown in FIG. 18 may be used. FIG. 18 shows an example where n is 2. As shown in FS transfer list 123, one transfer destination region may be associated with two or more transfer source regions contrary to FS transfer list 122 such that data is copied. For example, in the example in FIG. 18, as information included in list number 5, logical address regions of transfer destinations of two continuous clusters starting from "0x0015" are associated with logical address regions of transfer destinations of two continuous clusters of "0x000D" and "0x0010" such that data is copied. In both of the examples in FIGS. 17 and 18, a list number associated on 1-to-1 is set to an invalid logical address of "0xFFFF" to a region of transfer destination logical address 2 or a region of transfer source logical address 2.

Thus, by generating a FS transfer list in which transfer destination logical addresses and transfer source logical addresses are associated on 1-to-n (n is an integer equal to or more than 2) or on n-to-1 (n is an integer equal to or more than 2), it is possible to reduce a size of the FS transfer list and optimize copy operation. Further, both of settings of 1-to-n and n-to-1 may be combined to generate a FS transfer list in which settings of 1-to-n and n-to-1 are mixed.

FIG. 19 shows an example of FS transfer list 124 in which the settings of both of 1-to-n and n-to-1 are combined. For description of FS transfer list 124, an example of first FAT 305 and second FAT 306 included in a FAT file system constructed on first non-volatile memory 15 which is the transfer source in FIG. 11, and an example of first FAT 305 and second FAT 306 of a FAT file system constructed on second non-volatile memory 25 which is the transfer destination in FIG. 20 are used. FIG. 19 shows an example where n is 2. As information included in list number 1, logical address regions of transfer sources of three continuous clusters starting from "0x0002" are associated with logical address regions of transfer destinations of two continuous clusters starting from "0x0003" and a logical address region of a transfer destination of one cluster starting from "0x0008". As information included in list number 3, logical address regions of transfer sources of five continuous clusters starting from "0x0009" and one cluster starting from "0x0010" are associated with logical address regions of transfer destinations of six continuous clusters starting from "0x000F". List number 2 is associated on 1-to-1, and an invalid logical address of "0xFFFF" is set to transfer destination logical address 2 or a region of transfer source logical address 2.

Thus, by associating transfer destination logical addresses and transfer source logical addresses by mixing the settings of both of 1-to-n (n is an integer equal to or more than 2) and n-to-1 (n is an integer equal to or more than 2), it is possible to support various combinations of a number of continuous empty clusters of transfer destination logical addresses and a number of continuous empty clusters of transfer destination logical addresses, and optimize copy operation.

As described above, the exemplary embodiment has been described as an exemplary technique according to the present disclosure. Therefore, the accompanying drawings and the detailed description have been provided.

Accordingly, the components disclosed in the accompanying drawings and the detailed description include not only components which are required to solve the problem but also components which are not required to solve the problem in order to describe the above exemplary technique.

It should not be immediately understood that those components which are not required are necessary simply because these components which are not required are disclosed in the accompanying drawings and the detailed description.

Further, the above exemplary embodiment is the exemplary technique according to the present disclosure, and consequently can be variously changed, replaced, added and omitted in the range of the claims or the range equivalent to the claims.

What is claimed is:

1. An access system comprising:
a first access device having a first memory; and
a second access device having a second memory, the first access device being communicated with the second access device,
wherein
the first access device includes:
a file system controller that obtains first file system management information from the first memory and second file management information from the second memory, and generates a transfer list as a list used for copying a file to the first memory or the second memory, the first file system management information being used for managing a file system in the first memory and the second file system management information being for managing a file system in the second memory; and
a first memory controller that controls copying the file to the first memory and the second memory, and wherein
in copying the file by the first memory controller,
the file system controller generates the transfer list, transmits the transfer list to the first memory controller, and
the first memory controller controls copying the file in the first memory or the second memory, using the transfer list, and
wherein
the file system controller
calculates a length of one continuous region included in a data storage region of the transfer source file and a length of one continuous empty region in which data of the transfer destination file is stored based on the first file system management information and the second file system management information, compares the length of the continuous region and the length of the continuous empty region, and generates the transfer list using a smaller length between the length of the continuous region and the length of the continuous empty region as a copy operation unit.

2. The access system according to claim 1,
wherein the first access device is communicated with the second access device wirelessly.

3. The access system according to claim 2,
wherein, when copying, the first memory controller generates an access command for accessing the first memory and accesses the first memory, and generates another access command for accessing the second memory, further converts the another access command into a wireless packet, wirelessly transmits the wireless packet to the second access device, and accesses the second memory.

4. The access system according to claim 3,
wherein, after wirelessly transmitting the other access command to the second access device, the first memory controller wirelessly receives a result, obtained by performing the another access command, in a wireless communication packet from the second access device.

5. The access system according to claim 1, wherein
the second access device includes a second memory controller that controls the second memory and a communication between the first access device and the second access device, and
in copying the file to the second memory,
the first memory controller instructs the second memory controller to copy the file based on the transfer list, and
the second memory controller controls copying the file in the second memory.

6. The access system according to claim 1,
wherein the file system controller identifies an address of a transfer source and an address of a transfer destination based on the first file system management information and the second file system management information, and generates a transfer list which includes at least the address of the transfer source, the address of the transfer destination and a transfer data size.

7. The access device according to claim 1, wherein, for a data storage region of a transfer source file and a data storage region of a transfer destination file, the file system controller calculates a length of one continuous region included in the data storage region of the transfer source file and one or more continuous empty regions, a total length of the continuous empty regions being the same as the length of the continuous region, based on the first file system management information and the second file system management information, and generates the transfer list using one length among lengths of the continuous empty regions as a copy operation unit.

8. The access device according to claim 1,
wherein, for a data storage region of a transfer source file and a data storage region of a transfer destination file, the file system controller calculates a length of one continuous empty region as a region in which data of the transfer destination file is stored and one or more continuous regions, a total length of the continuous regions being the same as the length of the continuous empty region, based on the first file system management information and the second file system management information, and generates the transfer list using one length among lengths of the continuous regions as a copy operation unit.

9. An access device communicated with another access device having a second memory, the access device comprising:
a first memory;
a file system controller that obtains first file system management information from the first memory and second file management information from the second memory, and generates a transfer list as a list used for copying a file to the first memory or the second memory, the first file system management information being for managing a file system in the first memory and second file system management information being for managing a file system in the second memory; and
a first memory controller that controls copying the file in the first memory and the second memory, wherein
in copying the file to the first memory or the second memory,
the file system controller transmits the transfer list to the first memory controller, and
the first memory controller controls copying the file in the first memory or the second memory, using the transfer list, and
wherein
the file system controller
calculates a length of one continuous region included in a data storage region of the transfer source file and a length of one continuous empty region in which data of the transfer destination file is stored based on the first file system management information and the second file system management information, compares the length of the continuous region and the length of the continuous empty region, and generates the transfer list using a smaller length between the length of the continuous region and the length of the continuous empty region as a copy operation unit.

10. An information storage device connected to an access device communicated with another access device, the information storage device comprising:
a first memory; and
a first memory controller that controls copying of a file in the first memory and a second memory included in the other access device,
wherein the first memory controller receives a transfer list from the other access device as a list used for copying the file to the first memory or the second memory,
the transfer list being generated by the other access device based on first file system management information obtained from the first memory and second file management information obtained from the second memory, the first file system management information being for managing a file system in the first memory and the second file system management information being for managing a file system in the second memory, and
the first memory controller controls copying the file in the first memory or the second memory, using the transfer list, and wherein
the transfer list is generated based on a calculated length of one continuous region included in a data storage region of the transfer source file and a length of one continuous empty region in which data of the transfer destination file is stored using the first file system management information and the second file system management information, and based on the compared length of the continuous region and the length of the continuous empty region, the transfer list being generated using a smaller length between the length of the continuous region and the length of the continuous empty region as a copy operation unit.

* * * * *